(12) United States Patent
Baudasse et al.

(10) Patent No.: US 8,992,108 B2
(45) Date of Patent: Mar. 31, 2015

(54) SELF-DRIVEN ARTICULATION AND SELF-REGULATED ARTICULATED ASSEMBLY

(75) Inventors: Yannick Baudasse, Grasse (FR); Stéphane Vezain, Mandelieu (FR); Julien Ducarne, Cannes (FR)

(73) Assignee: Thales, Neuilly sur Seine (FR)

( * ) Notice: Subject to any disclaimer, the term of this patent is extended or adjusted under 35 U.S.C. 154(b) by 321 days.

(21) Appl. No.: 13/332,032

(22) Filed: Dec. 20, 2011

(65) Prior Publication Data

US 2012/0321372 A1 Dec. 20, 2012

(30) Foreign Application Priority Data

Dec. 23, 2010 (FR) ...................................... 10 05090

(51) Int. Cl.
*B64G 1/22* (2006.01)

(52) U.S. Cl.
CPC .................................... *B64G 1/222* (2013.01)
USPC ........................... 403/119; 244/172.6; 16/227

(58) Field of Classification Search
USPC .......... 403/102, 106, 111, 37–39, 31; 16/227, 16/373, 225, 226, 297, 292, 286; 244/172.7, 159.5, 49
See application file for complete search history.

(56) References Cited

U.S. PATENT DOCUMENTS

| | | | |
|---|---|---|---|
| 3,477,662 A * | 11/1969 | Anderson | 244/172.7 |
| 4,133,502 A | 1/1979 | Anchutin | |
| 5,086,541 A | 2/1992 | Auternaud et al. | |
| 5,546,632 A * | 8/1996 | Robinson et al. | 16/54 |
| 5,911,536 A * | 6/1999 | Roth | 403/119 |
| 6,682,020 B2 * | 1/2004 | Janson | 244/172.6 |
| 2009/0282646 A1 | 11/2009 | Baudasse et al. | |
| 2012/0137801 A1 * | 6/2012 | Baudasse et al. | 74/89.14 |

FOREIGN PATENT DOCUMENTS

| | | |
|---|---|---|
| EP | 0796785 A2 | 9/1997 |
| EP | 1193406 A2 | 4/2002 |
| FR | 2635077 A1 | 2/1990 |
| FR | 2902763 A1 | 12/2007 |
| WO | 0106145 A2 | 1/2001 |

* cited by examiner

*Primary Examiner* — Michael P Ferguson
*Assistant Examiner* — Daniel Wiley
(74) *Attorney, Agent, or Firm* — Baker and Hostetler LLP

(57) ABSTRACT

A self-driven articulation designed for automatically deploying the elements that it connects including two articulation fittings made to rotate under the action of at least one passive drive element. The articulation includes at least one flexible duct for regulating the speed at which it deploys.

8 Claims, 6 Drawing Sheets

SELF-DRIVEN ARTICULATION AND SELF-REGULATED ARTICULATED ASSEMBLY

CROSS-REFERENCE TO RELATED APPLICATION

This application claims priority to foreign French patent application No. FR 1005090, filed on Dec. 23, 2010, the disclosure of which is incorporated by reference in its entirety.

FIELD OF THE INVENTION

The invention relates to a self-driven articulation designed both automatically to deploy elements that it connects and to lock these elements in the deployed position. The invention also relates to an articulated assembly made up of various elements joined together by at least one articulation.

The invention applies more particularly, although not exclusively, to the field of space and notably to the manufacture of solar panels for satellites which panels are made up of various elements articulated together and which are deployed once they arrive in space. Numerous other applications can be imagined, both in the field of space and on earth.

BACKGROUND

Such an articulation is, for example, described in patent applications FR 2 635 077 and FR 2 902 763. This articulation takes the form of a mechanical system that is self-driven allowing it to open and therefore allowing the elements connected to it to be deployed. The articulation comprises two articulation fittings made to rotate under the action of at least one flexible element. The articulation is held without play by means of rolling strips that cross around the articulation fittings and are kept under tension by two rollers fitted with flexible tracks, each belonging to one of the articulation fittings. The articulation comprises a device for keeping it in what is known as the stored position, this for example being achieved by means of an explosive bolt or bolt cutter positioned in the region of the solar panels to which the articulation is attached.

The flexible element is for example formed by a Carpentier joint which applies a driving torque to cause the articulation to pass from its storage position into a position known as the deployed position. The drive torque is very uneven over the travel of the articulation and this leads to a speed of opening that is likewise uneven.

Moreover, in order to be certain of achieving the deployed position, it is necessary for the flexible element used to generate the torque that deploys the articulation to be oversized. For example, it is necessary to take into consideration the resistive torques due, for example, to the electrical cables situated between the panels and the friction inherent to any articulation. This oversizing means that energy is restored at the end of deployment in the form of an impact against the end stops of the articulation. The energy absorbed by the end stops is dependent on the speed of impact, and therefore difficult to predict. The oversizing of the driving element of the articulation leads to an oversizing of the articulation end stops and of the elements connected by the articulation which likewise experience impacts at the end of deployment.

SUMMARY OF THE INVENTION

The invention seeks to alleviate all or some of the above-mentioned problems by proposing a self-driven articulation in which the speed of opening is regulated thus making it possible to reduce the effect of impact at the end of opening even if the drive torque is significantly overrated.

To this end, the subject of the invention is a self-driven articulation intended to be mounted between two adjacent elements, comprising two articulation fittings made to rotate under the action of at least one passive drive element, which articulation comprises means for regulating the speed at which it deploys.

According to one particular embodiment, a first of the two articulation fittings comprises a first surface intended to roll without slipping at a point against a second surface belonging to a second of the two articulation fittings as the articulation turns. The means for regulating the speed at which the articulation deploys comprise a flexible duct compressed between the two surfaces at a moving point known as the rolling point. The duct comprises a restriction situated between two zones of the duct which are separated by the rolling point, and the duct contains a fluid the pressure of which increases ahead of the rolling point as the articulation fittings rotate.

Another subject of the invention is an articulated assembly made up of various elements joined together by an articulation according to the invention.

BRIEF DESCRIPTION OF THE DRAWINGS

The invention will be better understood and other advantages will become apparent from reading the detailed description of one embodiment given by way of example, which description is illustrated by the attached drawing in which.

For the sake of clarity, in the various figures the same elements will bear the same references.

DETAILED DESCRIPTION

Figure 1:
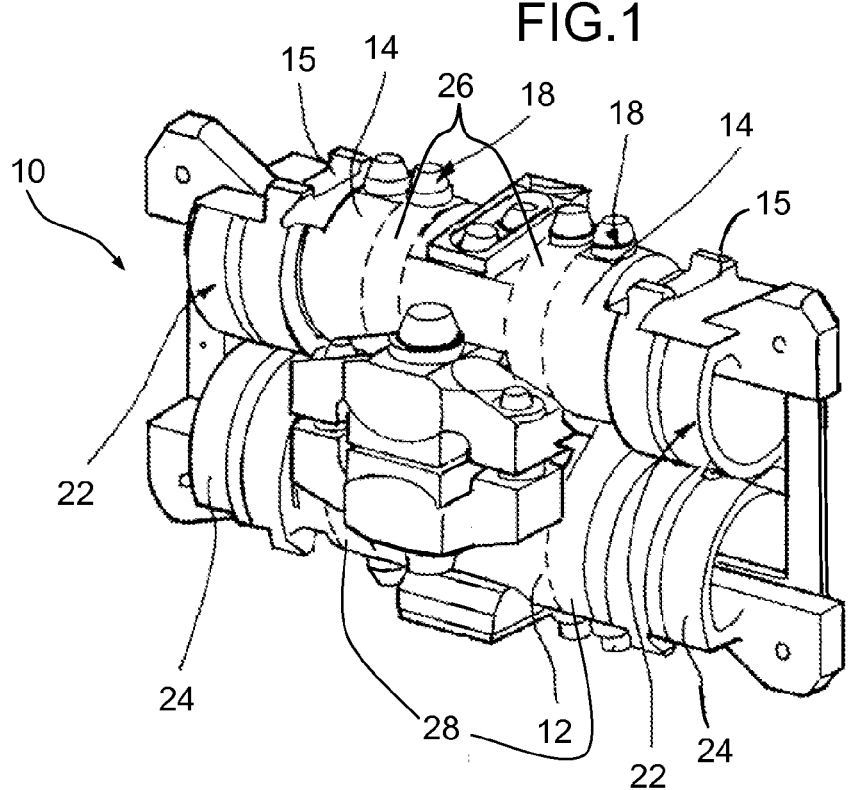
FIG. 1 depicts one example of an articulation according to the invention, the articulation being in the "storage" position.

An articulation 10 according to the invention comprises two articulation fittings 12 and 14 consisting, for example, of two machined cylindrical metal blocks. The articulation fittings 12 and 14 may be made lighter in weight by cavities when the application justifies so-doing, as is notably the case in the field of space. Each of the articulation fittings 12 and 14 is designed to be fixed to a corresponding element E1, E2 by any suitable means such as screws or rivets at anchor points 15.

The articulation may be fitted with rolling bearings, ball swivels or plain bearings to allow the two articulation fittings 12 and 14 to move relative to one another.

Each articulation fitting 12 and 14 comprises at least one flexible cylindrical surface, 22 and 24, respectively, which surfaces are intended to roll one against the other as the articulation moves. In the example depicted, the diameters of the cylindrical surfaces 22 and 24 are the same.

It is possible to produce the articulation with surfaces of any shape. One of the two surfaces is advantageously cylindrical so that it can roll over the other of the two surfaces. The term "cylindrical" is to be understood in the broadest sense. The radius of the cylinder may vary, for example as in the case of a cam or of a scroll, so as to form a substantially cylindrical shape.

Figure 2:
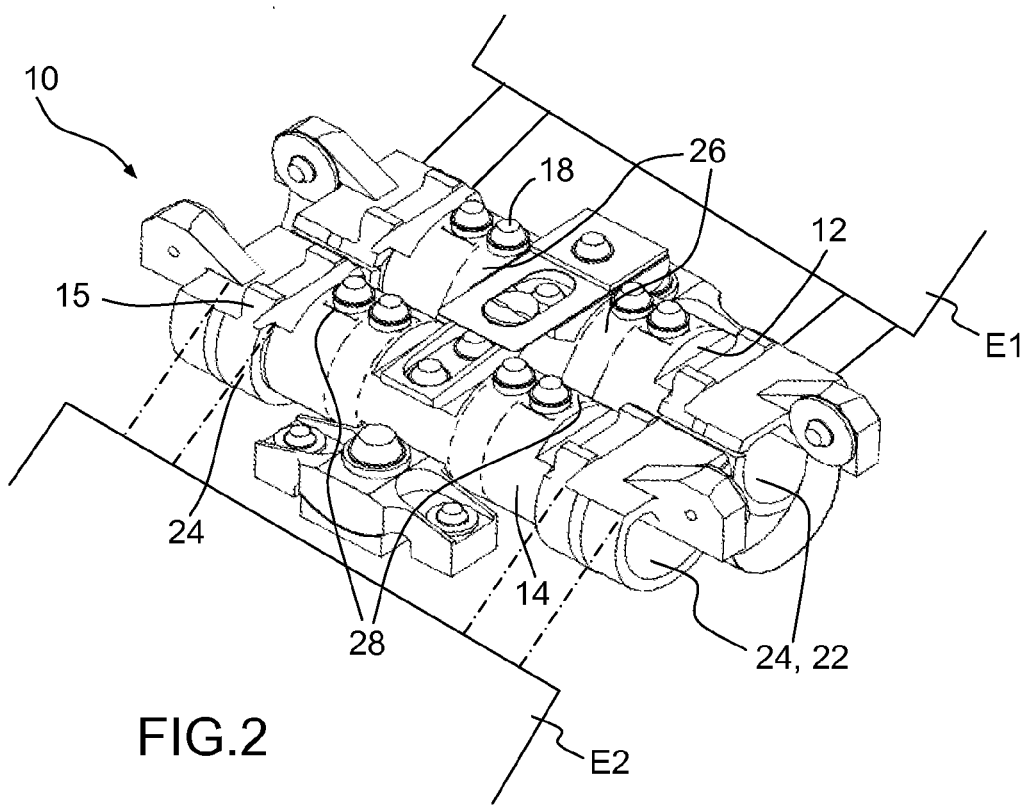
FIG. 2 depicts the articulation of FIG. 1 in the "deployed" position.
Figure 3:
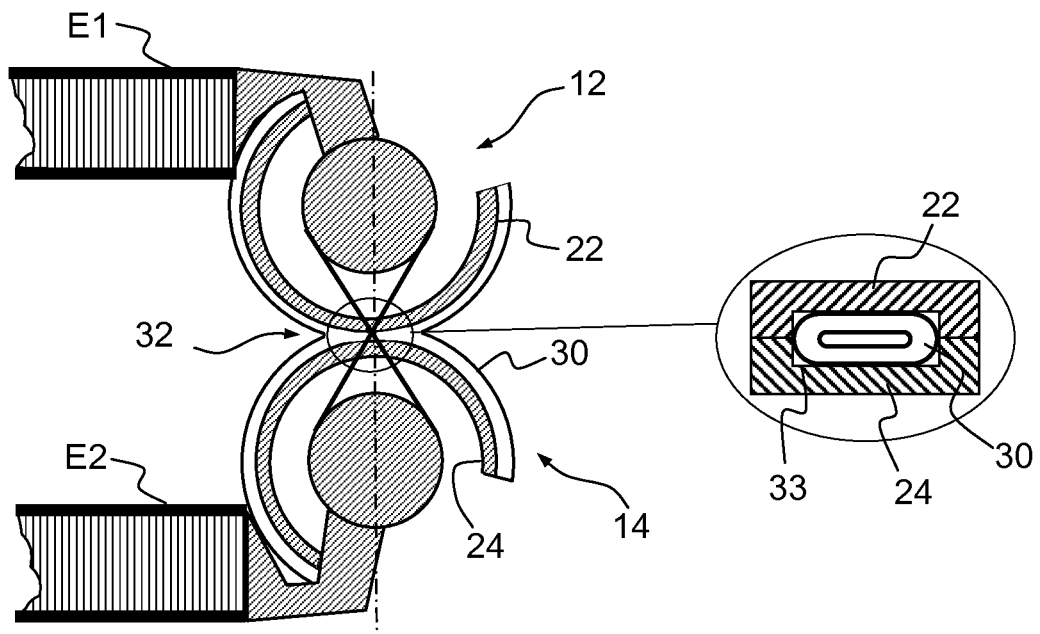
FIG. 3 schematically depicts the deployment dynamics of the articulation in the storage configuration.

The flexible cylindrical surfaces 22 and 24 roll over one another to allow the elements E1 and E2 to move between two extreme positions which are offset by 180° from one another. When the elements E1 and E2 are flat elements, the first of these positions is known as the furled or storage position, which corresponds to the scenario in which the elements E1 and E2 are folded one against the other and parallel to one another, while the second position, known as the deployed position, corresponds to the scenario in which these elements are open and lying in the same plane. FIGS. 1 and 3 correspond to the storage position and FIGS. 2 and 4 correspond to the deployed position.

In order to keep the flexible cylindrical surfaces 22 and 24 in permanent contact with one another as they roll against each other, the articulation 10 additionally comprises flexible metal strips 26 and 28 the ends of which are fixed to each of the articulation fittings so as to roll over the surfaces 22 and 24. These strips are rigid in their plane and flexible outside of the plane. They are made, for example, of stainless steel. They are known as rolling strips or guide strips.

By way of example, the articulation 10 comprises two central adjacent rolling strips 26, positioned in the central part of the articulation fittings 12 and 14 and rolled in the same direction over the cylindrical surfaces 22 and 24 on each side of a mid plane common to these articulation fittings. A first end of each of the rolling strips 26 is fixed directly to the articulation fitting 12. This attachment is performed for example using screws 18. From this end, the strips 26 pass between the cylindrical surfaces 22 and 24 so that they are successively in contact with the surface 22 and then with the surface 24. A movement of the articulation 10 in the direction of deployment therefore has the effect of unrolling the strips from one articulation fitting and at the same time rolling them up on the opposite articulation fitting.

In the example illustrated, the articulation 10 comprises two other rolling strips 28, fixed to the exterior parts of the articulation fittings 12 and 14, near each of the strips 26 (which are themselves fixed to the interior parts of the articulation fittings 12, 14), likewise symmetrical with respect to a mid plane of the articulation fittings. The rolling strips 28 are wound in opposite directions to the strips 26 over the articulation fittings so that the strips 26 and 28 cross one another over cylindrical parts of the articulation fittings 12 and 14.

The drive for the articulation 10 is, for example, afforded by means of elastic belts, not visible in the various figures, and which cause automatic deployment of the articulation and lock it in the deployed position. One exemplary embodiment of such elastic belts is described in patent application FR 2 635 077.

According to the invention, the articulation 10 comprises means for regulating the speed at which it deploys. These means for example are formed of a flexible duct 30 which may be secured to one of the articulation fittings, in this instance the fitting 14, and compressed by the other articulation fitting 12. The duct 30 is therefore secured to the cylindrical surface 24 and the compression of the duct 30 occurs at rolling point 32 of the two cylindrical surfaces 22 and 24.

The duct 30 comprises a restriction 34 situated between two zones 36 and 38 of the duct 30 which are separated by the rolling point 32. In order to have good control over the dimensions of the restriction at the rolling point 32, a groove 33 may be machined in both of the cylindrical surfaces 22 and 24. The duct 30 contains a fluid the pressure of which increases ahead of the rolling point 32 as the articulation fittings 12 and 14 rotate. The difference in pressure between the two zones 36 and 38 increases with the speed at which the rolling point 32 shifts along the duct 30. This difference in pressure generates a restrictive torque in the rotation of the two cylindrical surfaces 22 and 24. Hence, the more the rotational speed increases, the more the resistive torque increases, thus allowing the speed at which the two articulation fittings 12 and 14 rotate relative to one another to be regulated.

The fluid is, for example, liquid, and the speed is regulated by throttling the fluid in the restriction 34. The liquid chosen is one that is capable of remaining liquid in all the storage and operating conditions of the articulation 10. In the field of space, an alcohol based liquid that can be used in a temperature range of the order of −100° C. to +100° C. may be chosen. A fluid laden with microparticles or nanoparticles may also be used for its thickening and damping properties. For example, ferromagnetic particles, particles of titanium dioxide, or carbon nanotubes may be used.

The restriction 34 may be a simple reduction in cross section realized in the duct 30. It is also possible to place within the duct a foam or a filter that generates a pressure drop as the fluid moves in the duct 30.

Figure 5:
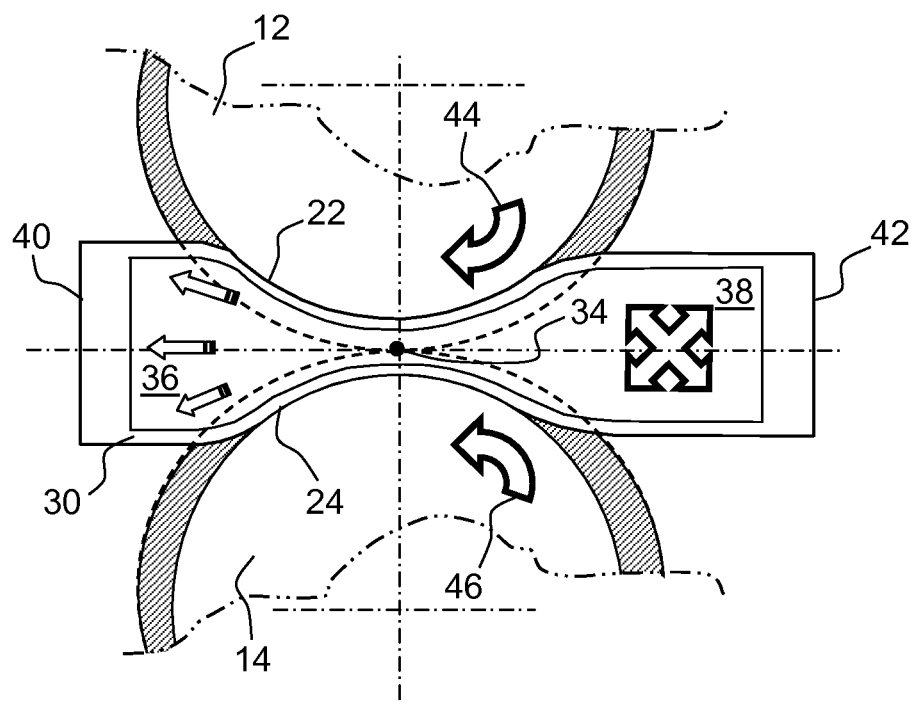
FIG. 5 schematically depicts a first embodiment of means for regulating the speed at which the articulation deploys.

FIG. 5 schematically depicts a first embodiment of means for regulating the speed of deployment of the articulation 10. In this first embodiment, the restriction 34 is formed by the compression of the duct 30 at the rolling point 32 so that fluid can pass therethrough under stress. Ends 40 and 42 of the duct 30 are blocked. As the two articulation fittings 12 and 14 rotate on one another, which rotation is depicted by arrows 44 in the case of the fitting 12 and 46 in the case of the fitting 14, the pressure of the fluid increases in the zone 38 as compared with that of the zone 36. The fluid tends to balance out the pressures in the two zones 36 and 38 by flowing through the restriction 34. A characteristic dimension of the restriction 34, in this instance its bore section, is given by the distance that separates the axes of rotation of the two cylindrical surfaces 22 and 24 or by the depth of the cylindrical groove 33 when this groove is made in both of the cylindrical surfaces 22 and 24.

Figure 6:
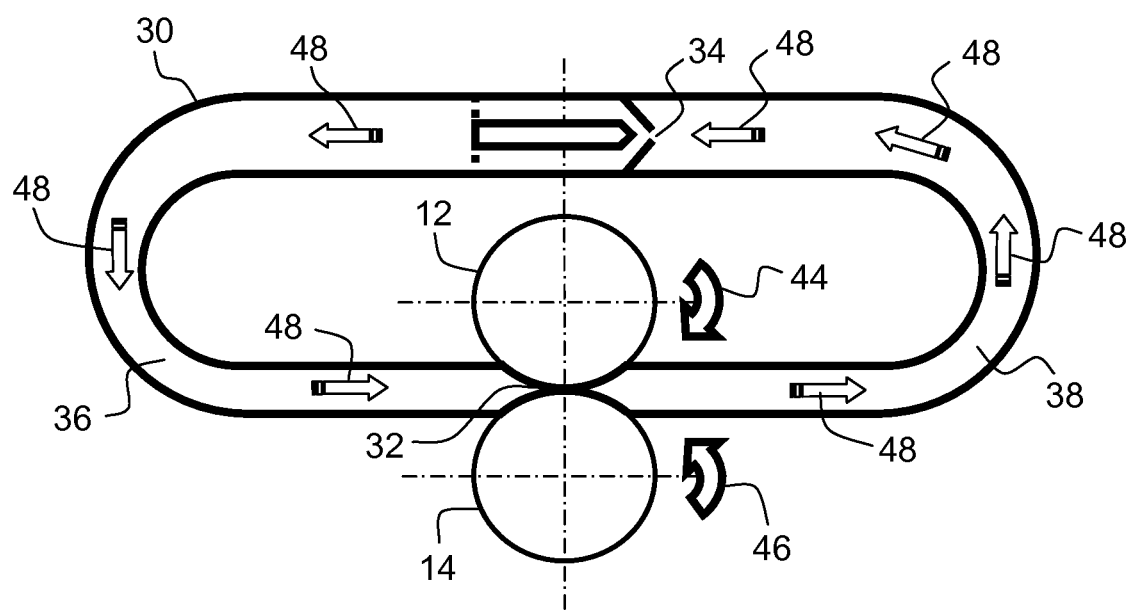
FIG. 6 schematically depicts a second embodiment of means for regulating the speed at which the articulation deploys.

FIG. 6 schematically depicts a second embodiment of means for regulating the speed of deployment of the articulation 10. In this second embodiment, the restriction 34 is separate from the rolling point 32 which, in the example depicted, completely nips the duct 30 and does not allow the fluid to pass. The two zones 36 and 38 are located between the restriction 34 and the rolling point 32. The duct 30 forms a closed circuit. The fluid is driven through the duct 30 by the shifting of the rolling point 32 and this shifting is depicted by arrows 48.

Figure 4:
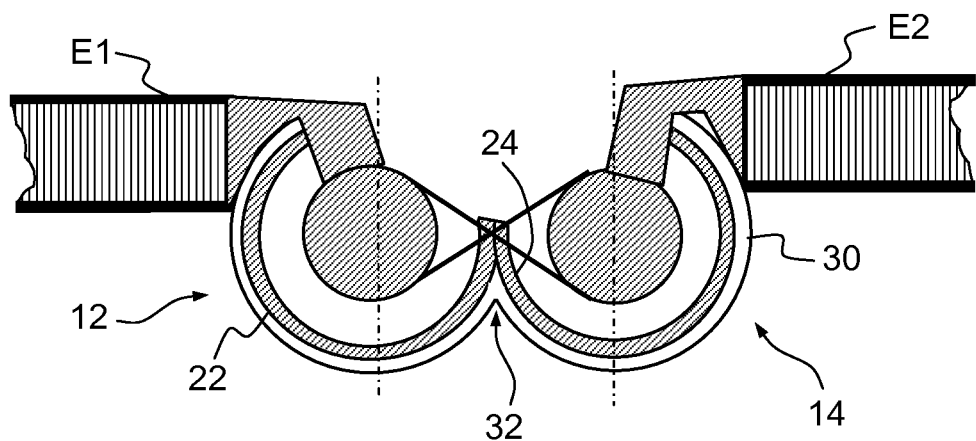
FIG. 4 schematically depicts the deployment dynamics of the articulation in the deployed configuration.

FIGS. 5 and 6 depict the duct 30 nipped between the cylindrical surfaces 22 and 24 at the rolling point 32. Near this point the duct 30 is straight. Alternatively, the duct 30 may be secured to and wound around one of the cylindrical surfaces, as depicted in FIGS. 3 and 4.

The torque resisting the rotation of the two cylindrical surfaces 22 and 24 relative to one another is dependent on viscosity of the fluid. This viscosity changes with the temperature of the fluid. This is particularly a sensitive issue in the field of space where the amount of heat may be significant. In general, the viscosity is higher at low temperatures than at higher temperatures. The speed of the articulation 10 therefore increases with an increase in temperature. In order to reduce the effects that variations in temperature have on the speed regulation, the articulation 10 may comprise means for varying a characteristic dimension of the restriction 34 as a function of a variation in the viscosity of the fluid.

Figure 7A:
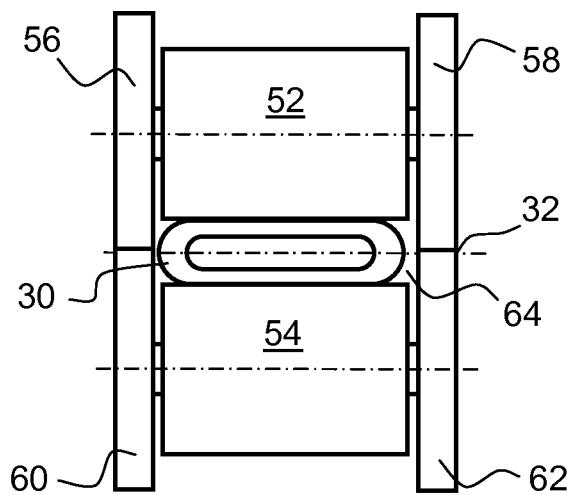
FIGS. 7A and 7B depict means for controlling the speed regulation as a function of temperature, which means are suited to the first embodiment.
Figure 7B:
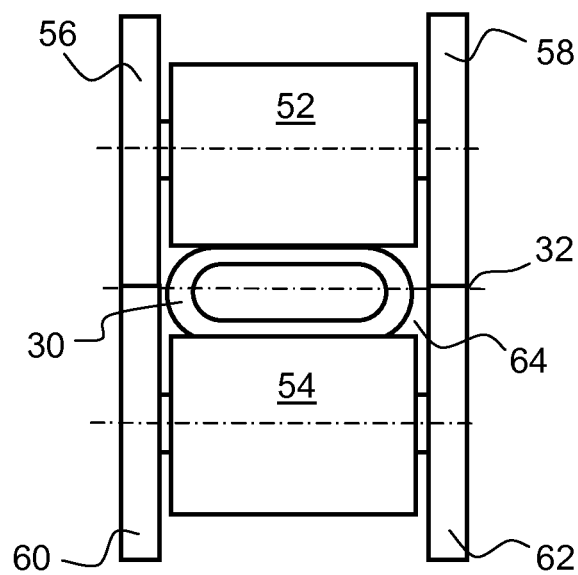

FIGS. 7A and 7B depict one example of these means suited to the first embodiment depicted in FIG. 5. More specifically, the two cylindrical surfaces 22 and 24 are formed of rollers 52 and 54 respectively, each secured to two wheels 56 and 58 in the case of the roller 52 and 60 and 62 in the case of the roller 54. On one side of the rollers 52 and 54 the wheels 56 and 60 roll one over the other and on the other side of the rollers 52 and 54 the wheels 58 and 62 roll one over the other. The wheels 56 and 58 have the same diameter which is greater than that of the roller 52. Likewise, the wheels 60 and 62 have the same diameter which is greater than that of the roller 54. These differences in diameter make it possible to create a space 64 between the two rollers 52 and 54 in which space the duct 30 is nipped to form the restriction 34. By choosing, for the rollers 52 and 54 on the one hand and for the wheels 56 to 62 on the other, materials the respective thermal expansion coefficients of which differ, it is possible to vary the separation of the rollers 52 and 54, the dimensions of the space 64 and, therefore, the characteristic dimension of the restriction 34. For example, the material chosen for the rollers 52 and 54 is one that has a thermal expansion coefficient that is higher than that of the material of the wheels 56 to 62. Thus, at low temperature, as depicted in FIG. 7B, the characteristic dimension of the restriction 34 is smaller than it is at high temperature as depicted in FIG. 7A.

Figure 8A:
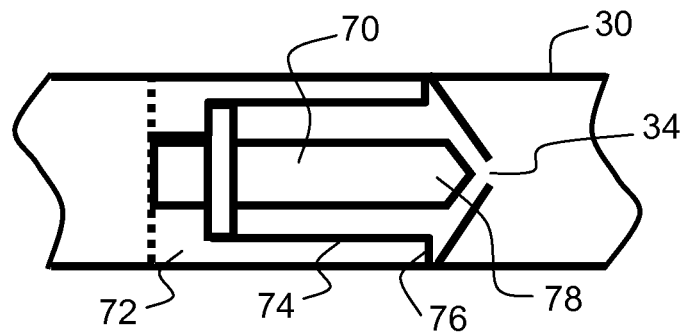
FIGS. 8A and 8B depict means for controlling the speed regulation as a function of temperature, which means are suited to the second embodiment.
Figure 8B:
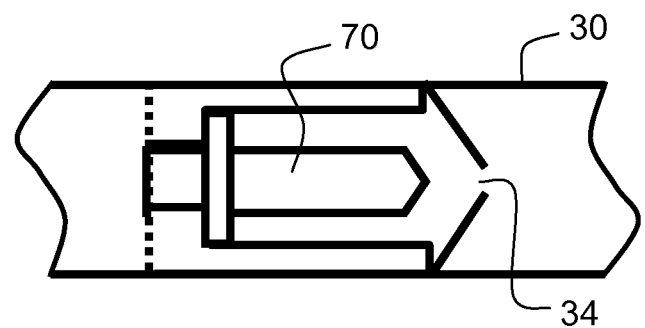
Figure 9:
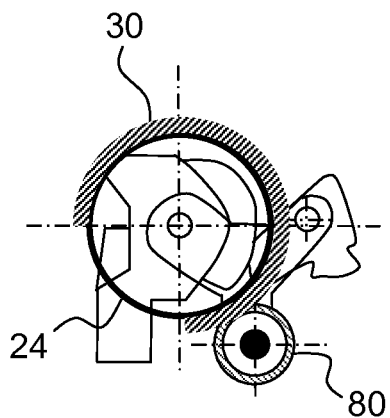
FIGS. 9 to 12 depict another embodiment of an articulation according to the invention.
Figure 10:
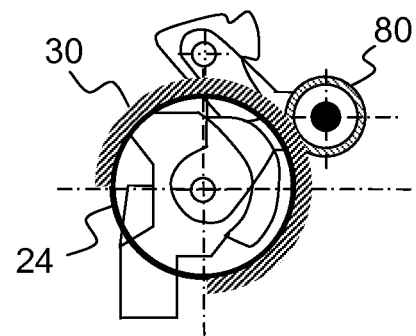
Figure 11:
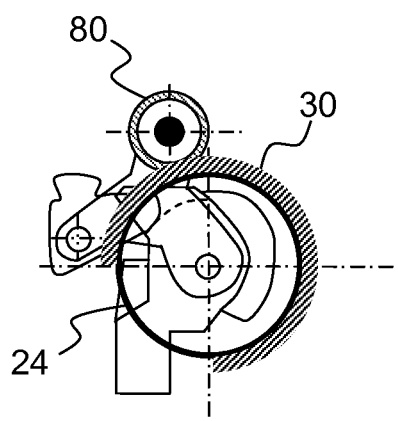
Figure 12:
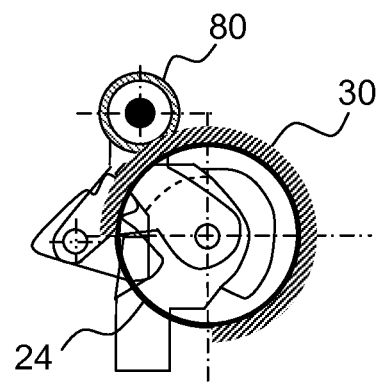

FIGS. 8A and 8B depict another example of means for varying a characteristic dimension of the restriction 34 which is suited to the second embodiment depicted in FIG. 6. More specifically, the restriction 34 may be partially obstructed by a needle valve 70. The needle valve is assembled at a first end 72 of a support 74 secured to the duct 30. The restriction 34 for its part is assembled with a second end 76 of the support 74. As before, by choosing for the needle valve 70 a material the thermal expansion coefficient of which is higher than that of the support, the tip 78 of the needle valve 70 is made to shift and blocks off the restriction 34 to a greater or less extent according to the variations in the temperature of the fluid, as depicted at high temperature in FIG. 8 in which the characteristic dimension of the restriction 34 is small by comparison with FIG. 8B which is at a lower temperature.

FIGS. 9 to 12 depict another embodiment of an articulation comprising means for regulating the speed at which it deploys.

The duct 30 is secured to the cylindrical surface 24. In this example, a rolling wheel 80 rolls without slipping on the cylindrical surface 24. The rolling wheel 80 has a circular cross section and a diameter smaller than that of the cylindrical surface 24. In this example, it is possible to use a rolling wheel that is not of circular cross section, such as a variable radius cam for example. FIGS. 9 to 12 depict the articulation in various positions starting out from the storage position in FIG. 9 as far as the deployed position in FIG. 12.

The invention claimed is:

1. A self-driven assembly comprising:
   two adjacent elements each including articulation fittings attached to ends thereof and made to rotate about each other, a first of the two articulation fittings having a substantially cylindrical first surface positioned to roll without slipping along a substantially cylindrical second surface of a second of the two articulation fittings, the first and second surfaces defining substantially parallel central axes;
   means for biasing the first and second elements to rotate about each other along their respective surfaces between a storage position, in which the elements are rotated towards each other, and a deployed position, in which the elements are rotated away from each other; and
   at least one flexible duct compressed between the two surfaces at a moving rolling point, wherein the duct includes a restriction situated between two zones of the duct which are separated by the rolling point, and
   wherein the duct contains a fluid, the pressure of which increases ahead of the rolling point as the articulation fittings rotate from the storage position to the deployed position, such that the rotational speed of the first and second surfaces relative to the rolling point is regulated by the difference in pressure between the two zones of the duct.

2. The assembly as claimed in claim 1, wherein the flexible duct is secured to the second surface.

3. The assembly as claimed in claim 2, wherein the first surface is cylindrical.

4. The assembly as claimed in claim 2, wherein at least one of the two surfaces is of variable radius.

5. The assembly as claimed in claim 1, wherein the restriction is formed by compression of the duct at the rolling point and wherein ends of the duct are blocked.

6. The assembly as claimed in claim 1, wherein the duct forms a closed circuit, and wherein the two zones are located between the restriction and the rolling point.

7. The assembly as claimed in claim 1, wherein a characteristic dimension of the restriction varies as a function of a variation in the viscosity of the fluid.

8. The assembly as claimed in claim 7, wherein the two surfaces are each formed by a roller secured to two wheels, and wherein the characteristic dimension of the restriction varies due to different thermal expansion coefficients between the roller and the two wheels of each of the two surfaces.

* * * * *